(12) United States Patent
Hiraoka (10) Patent No.: US 8,443,397 B2
(45) Date of Patent: May 14, 2013

(54) BROADCAST RECEIVING APPARATUS (75) Inventor: Michiaki Hiraoka, Yokohama (JP)

(73) Assignee: Kyocera Corporation, Kyoto (JP)

( * ) Notice: Subject to any disclaimer, the term of this patent is extended or adjusted under 35 U.S.C. 154(b) by 540 days.

(21) Appl. No.: 12/521,538

(22) PCT Filed: Dec. 26, 2007

(86) PCT No.: PCT/JP2007/074976
§ 371 (c)(1),
(2), (4) Date: Aug. 28, 2009

(87) PCT Pub. No.: WO2008/084696
PCT Pub. Date: Jul. 17, 2008

(65) Prior Publication Data
US 2010/0319024 A1  Dec. 16, 2010

(30) Foreign Application Priority Data
Dec. 27, 2006  (JP) .................. 2006-352692

(51) Int. Cl.
G06F 3/00   (2006.01)
G06F 13/00  (2006.01)
H04N 5/445  (2006.01)
H04N 7/16   (2006.01)
H04N 7/173  (2011.01)

(52) U.S. Cl.
USPC ............... 725/53; 725/57; 725/62; 725/118; 725/131; 725/134; 345/173

(58) Field of Classification Search ............ 725/39, 725/53, 54, 57, 62, 110, 118, 131, 134, 151; 345/173; 348/14.03
See application file for complete search history.

(56) References Cited

U.S. PATENT DOCUMENTS 5,545,857 A * 8/1996 Lee et al. ............... 178/18.03
5,671,014 A * 9/1997 Ito et al. .................... 348/239

(Continued)

FOREIGN PATENT DOCUMENTS

JP  05-227578  9/1993
JP  10-191468  7/1998

(Continued)

OTHER PUBLICATIONS

Japanese language office action dated Aug. 31, 2011 and its English language translation for corresponding Japanese application 2008553065.

(Continued)

*Primary Examiner* — Pinkal R Chokshi
(74) *Attorney, Agent, or Firm* — DLA Piper LLP (US)

(57) ABSTRACT

There is provided a broadcast receiving apparatus 10, comprising a reception unit 13 receiving a broadcast signal from a plurality of channels; a display unit 20 displaying video which corresponds to the broadcast signal; a touch panel 23 accepting handwritten input by a user; a character recognition unit 24 recognizing handwritten input onto the touch panel 23 as a character or a character string; a memory unit 21 storing for each channel a character or a character string specifying the channel; and a control unit 11 switching a reception channel, when a character or a character string recognized by the character recognition unit 24 corresponds to any one of characters or character strings stored in the memory unit 21 while video corresponding to a broadcast signal received at the reception unit 13 is displayed on the display unit 20, to a channel corresponding to the character or the character string.

3 Claims, 8 Drawing Sheets

U.S. PATENT DOCUMENTS

| | | | |
|---|---|---|---|
| 5,889,506 A | 3/1999 | Lopresti | |
| 5,917,475 A * | 6/1999 | Kuzunuki et al. | 345/173 |
| 6,407,779 B1 * | 6/2002 | Herz | 348/734 |
| 7,190,348 B2 * | 3/2007 | Kennedy et al. | 345/168 |
| 2001/0040551 A1 * | 11/2001 | Yates et al. | 345/156 |
| 2004/0210933 A1 * | 10/2004 | Dresti et al. | 725/40 |
| 2005/0188418 A1 * | 8/2005 | Uchida et al. | 725/135 |
| 2005/0278737 A1 * | 12/2005 | Ma et al. | 725/40 |
| 2006/0123449 A1 * | 6/2006 | Ma et al. | 725/58 |
| 2006/0257008 A1 * | 11/2006 | Nolle et al. | 382/128 |
| 2009/0083802 A1 * | 3/2009 | Kohno et al. | 725/59 |
| 2009/0184926 A1 * | 7/2009 | Kates | 345/163 |

FOREIGN PATENT DOCUMENTS

| | | |
|---|---|---|
| JP | 2001-119638 | 4/2001 |
| JP | 2002-084469 | 3/2002 |
| JP | 2002-176477 | 6/2002 |
| JP | 2006-084329 | 3/2006 |
| WO | 03088655 A1 | 10/2003 |

OTHER PUBLICATIONS

Japanese language official decision of rejection dated Aug. 30, 2011 and its English language translation for corresponding Japanese application 2008553065.

Japanese language interrogation dated Apr. 17, 2012 and its English language translation issued in corresponding Japanese application 2008553065.

Japanese language office action dated Nov. 13, 2012 and its English language translation issued in corresponding Japanese application 2008553065 cites the foreign patent application document above.

Japanese language office action (appeal decision of refusal) dated Mar. 19, 2013 and its English language translation issued in corresponding Japanese application 2008553065.

* cited by examiner

| Channel number / Region | 1 | 3 | 4 | 6 | 8 | 10 | 12 |
|---|---|---|---|---|---|---|---|
| Tokyo | NHK | NHK Education | Nippon Television | TBS | Fuji Television | TV Asahi | TV TOKYO |

(b)

| Affiliate station / Broadcast region | NNN | JNN | FNN | ANN | TXN |
|---|---|---|---|---|---|
| Tokyo | Nippon Television, Nittele, NTV, etc. | TBS, etc. | Fuji Television, Fuji, CX, etc. | TV Asahi, Tele Asa, EX, etc. | TV TOKYO, Tele To, TX, etc. |
| Osaka | Yomiuri Telecasting Corporation, YTV10, etc. | Mainichi Broadcasting System, MBS4, etc. | Kansai Telecasting Corporation, KTV8, etc. | Asahi Broadcasting Corporation, ABC6, etc. | Television Osaka, TV0, etc. |
| Hokkaido | Sapporo Television Broadcasting, STV5, etc. | Hokkaido Broadcasting, HBC1, etc. | Hokkaido Cultural Broadcasting, uhb8, etc. | Hokkaido Television Broadcasting, HTB6, etc. | Television Hokkaido Broadcasting, TVh7, etc. |

BROADCAST RECEIVING APPARATUS

CROSS REFERENCE TO RELATED APPLICATION

This application is a national stage of International Application No. PCT/JP2007/074976 filed on Dec. 26, 2007, which also claims the benefit of priority under 35 USC 119 to Japanese Patent Application No. 2006-352692 filed on Dec. 27, 2006, the entire contents of which are incorporated herein by reference.

TECHNICAL FIELD

The present invention relates to a broadcast receiving apparatus and, in particular a broadcast receiving apparatus in which a user can promptly switch a reception channel to a desired one by simple operation.

BACKGROUND ART

Recently, a TV broadcast receiving apparatus with a large screen as used for home theater system gains popularity, while the needs for a relatively small size of TV broadcast receiving apparatus with a crystal display or the like used for individuals are also increasing. Especially, there is recently developed a portable terminal having a function of a TV broadcast receiving apparatus therein, and it is expected that, with start of broadcasting by 1 segment portion reception service (one-seg) for a cellular phone and a mobile terminal in terrestrial digital TV broadcasting, a portable terminal having a function of a TV broadcast receiving apparatus will be significantly widespread.

As a conventional portable terminal, on the other hand, there is disclosed a portable terminal device which can be folded with its display unit outside in Japanese Patent Application Laid-Open Publication No. 2002-176477, for example.

Figure 8:
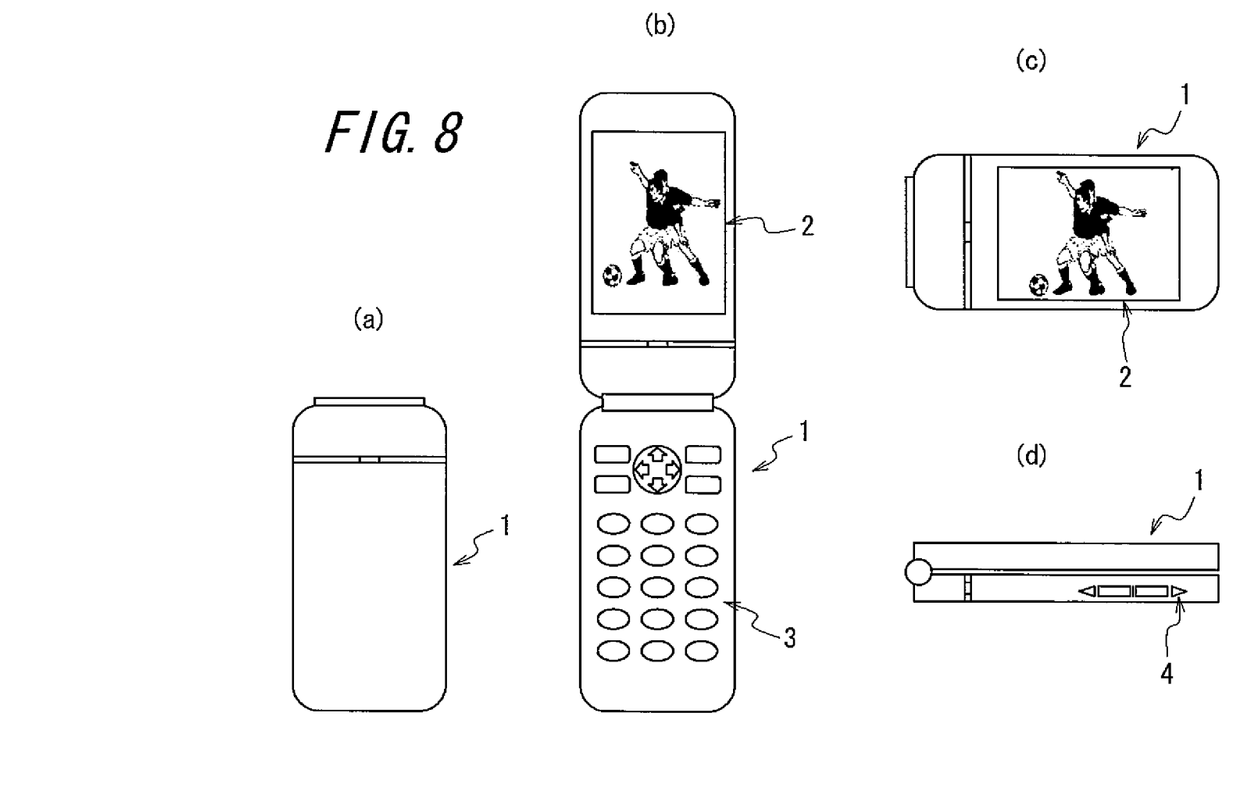
FIG. 8 is a diagram explaining the structure of a conventional portable terminal.

As a portable terminal having a TV broadcast receiving function adopting a folding structure as disclosed in Japanese Patent Application Laid-Open Publication No. 2002-176477, one shown in FIG. 8, for example, is conceivable. The portable terminal 1 is designed so that it is normally folded with its display unit inside, as shown in FIG. 8 (*a*). When the telephone function is used in this state, the portable terminal 1 is left open so that a display unit 2 can be viewed, as shown in FIG. 8 (*b*), and then key operation through an operation key unit 3 allows a call.

When watching a TV broadcasting, moreover, a channel can be selected by operation of keys at the operation key unit 3 with the portable terminal 1 being open, as shown in FIG. 8 (*b*). In addition, the portable terminal 1 can be folded with the display unit 2 outside, which allows watching also in a viewing mode as shown in FIG. 8(*c*) (hereinafter arbitrarily referred to as "view style"). In this case, channels cannot be switched by operation of keys at the operation key unit 3. Therefore, it is conceivable that the side surface of the portable terminal 1 is provided with another side key unit 4 which is different from the operation key unit 3, and channels can be selected by channel-up/down with use of these keys.

Even in so-called sliding-type or revolving-type portable terminals besides one such as the portable terminal 1 in which the display unit 2 is rotated to set view style, many of portable terminals are generally devised so that the terminal can be transformed to be in a compact form when TV is watched on the portable terminal. Many of such portable terminals also have other keys which are different from ones used for usual calls and the like on their outer surface so that channels can be switched still in view style when a user switches channels while watching TV on the terminal in its compact form.

In such portable terminal, however, there is a problem that a channel cannot be switched to a desired one promptly when a user wants to switch channels while watching a TV program. For example, when channels are switched while a TV program is watched in view style as shown in FIG. 8(*c*), it is common that channel-up/down is performed by pressing keys at the side key unit 4 on the side surface of the terminal body, as shown in FIG. 8(*d*). In this case, however, a channel can be changed only by one-up or one-down. Therefore, when a channel which a user wants to watch is separated from a channel being currently watched by several numbers of channels, the operation for changing channels becomes troublesome. It is significantly troublesome especially in a portable terminal requiring a certain time to control a sequential channel switches.

Furthermore, the side key unit on the side surface of the body may be provided with volume adjusting keys and the like besides channel-up/down keys. In this case, it is possible to operate such keys confusing with keys used for channel changing operation. In order to avoid such troublesomeness and to directly press a key for selecting a desired channel, it is required that a folded terminal body is opened to the state shown in FIG. 8(*b*) and then key operation is carried out with use of the operation key unit 3. That is, even if the portable terminal body is in a compact view style, the body has to be in a large style once. In any cases, when a user intends to change channels while the terminal body is in a style in which the user is watching a TV program, additional efforts and time are required, which causes the user to feel stressed.

Furthermore, when a user wants to search a program which he wants to watch or when a user wants to search a corresponding program from the genre of a program which he wants to watch, there are some possible operations on conventional portable terminals: a program list based on information such as EPG (electronic program guide) and the like is superimposingly displayed on the display unit while a user is watching a TV program and a desired program is selected therefrom; or another browser is activated separately and a keyword of a program which the user wants to watch is input to the browser to search the program, thereafter the user himself carries out operation to change a channel to one in which such program is broadcasted. In this case also, however, it takes time to shift to a search page, or the operation for starting search actually is troublesome. Thus, additional efforts and time are required to change channels, which causes the user to feel stressed.

DISCLOSURE OF THE INVENTION

Therefore, in the view of the above problem, the object of the invention is to provide a broadcast receiving apparatus in which a user can switch a channel to a desired one simply and promptly while watching a program which is currently watched.

The first aspect of the invention to achieve the above object is to provide a broadcast receiving apparatus, comprising a reception unit receiving a broadcast signal from a plurality of channels;

a display unit displaying video which corresponds to the broadcast signal;

a touch panel accepting handwritten input by a user;

a character recognition unit recognizing handwritten input onto the touch panel as a character or a character string;

a memory unit storing for each channel a character or a character string specifying the channel; and a control unit switching a reception channel, when a character or a character string recognized by the character recognition unit corresponds to any one of characters or character strings stored in the memory unit while video corresponding to a broadcast signal received at the reception unit is displayed on the display unit, to a channel corresponding to the character or the character string.

Furthermore, the second aspect of the invention to achieve the above object is to provide a broadcast receiving apparatus, comprising a reception unit receiving a broadcast signal from a plurality of channels;

a display unit displaying video which corresponds to the broadcast signal;

a touch panel accepting handwritten input by a user;

a character recognition unit recognizing handwritten input onto the touch panel as a character or a character string;

a memory unit storing program-related information including a time, a name and a content explanation of a program broadcasted in each of the plurality of channels;

a program search unit matching the character or the character string recognized at the character recognition unit with the program-related information and searching a program corresponding to the program-related information including the character or the character string recognized by the character recognition unit among currently-broadcasted programs while video corresponding to the broadcast signal received at the reception unit is displayed on the display unit; and a control unit switching a reception channel, when the program search unit finds a program corresponding to the program-related information including the character or the character string recognized by the character recognition unit, to a channel in which the program is broadcasted.

The third aspect of the invention is to provide the broadcast receiving apparatus according to the second aspect, wherein the control unit has a selection unit allowing a user, when the program search unit finds a plurality of programs corresponding to the program-related information including the character or the character string recognized by the character recognition unit, to select a desired one from the plurality of found programs.

DESCRIPTION OF EMBODIMENTS

Preferred embodiments of the invention will now be described with reference to the accompanying drawings. It is noted that same or similar units are provided with same or similar symbols in the following drawings.

Figure 1:
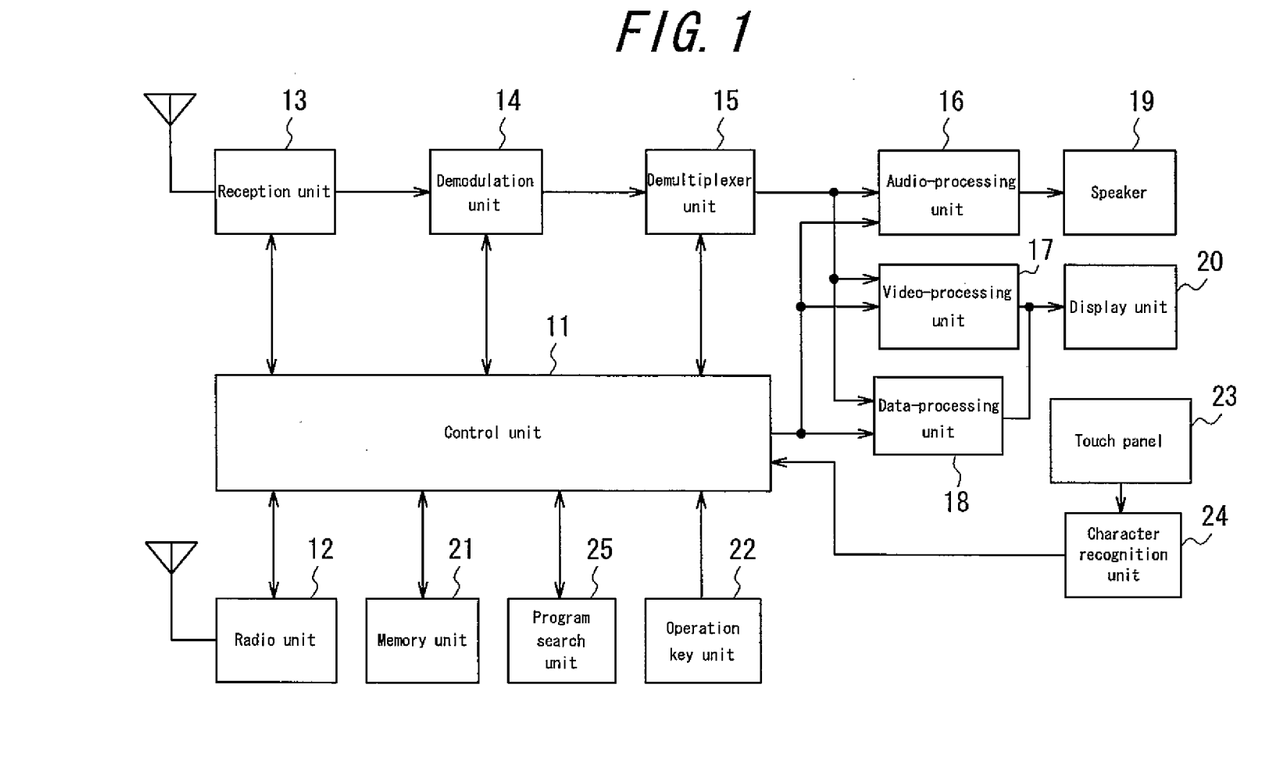
FIG. 1 is a block diagram illustrating circuit configuration of a main part of a broadcast receiving apparatus according to an embodiment of the invention.

FIG. 1 is a block diagram illustrating circuit configuration of a main part of a broadcast receiving apparatus according to an embodiment of the invention.

This portable terminal 10 is a portable communication terminal in which TV reception function for watching so-called one-segment broadcasting which is terrestrial digital TV broadcasting is installed in a cellular phone terminal allowing network communication to Internet, for example, and has a control unit 11 for controlling the whole terminal, a radio unit 12 constituting, with an antenna unit for communication line, a communication unit and a reception unit 13 constituting a broadcast reception unit receiving terrestrial digital broadcasting via an antenna unit for broadcast reception.

The radio unit 12 modulates audio information, email and the like which are processed by the control unit 11, and transmits them by radio from the transmission/reception antenna to a base station not shown. Moreover, the radio unit 12 demodulates various kinds of information such as email, audio information and the like which are transmitted from the base station by radio and received at the transmission/reception antenna and then transmits them to the control unit 11.

On the other hand, broadcast reception signals received at the reception unit 13 via the antenna unit are subjected to selection at the reception unit 13 under the control of the control unit 11. From the selected broadcast signals, transport stream (TS) packets are extracted at a demodulation unit 14 and provided to a demultiplexer unit 15. The demultiplexer unit 15 demultiplexes the packets to an audio-processing unit 16, a video-processing unit 17, and a data-processing unit 18 depending on packet IDs.

The audio information obtained at the audio-processing unit 16 is output from a speaker 19, while video information and data information obtained at the video-processing unit 17 and the data-processing unit 18 respectively, are displayed on a display unit 20 through a display control unit 12 not shown.

Furthermore, the portable terminal 10 of the embodiment has a memory unit 21 for storing various kinds of data and an operation key unit 22 for operating the portable terminal 10.

In the embodiment, an electronic program guide (EPG) for terrestrial digital TV broadcasting is stored in the memory unit 21 with being updated. The electronic program guide may be acquired by storing program sequence information (SI) received at the broadcast reception unit in the memory unit 21, or by accessing a web site of a desired content provider on the Internet through the communication unit and downloading it into the memory unit 21.

Here, the electronic program guide is created based on program sequence information, and the program sequence information includes a network ID (NID) for identifying a content provider, a transport stream ID (TID) for identifying a broadcast channel, a service ID (SID) for identifying a segment provided for a broadcast program in a broadcast channel, and an event ID (EID) for identifying a broadcast program.

Furthermore, the portable terminal 10 of the embodiment has a touch panel 23 which is integrated in the front surface of the display unit 20 and receives handwritten input by a user, a character recognition unit 24 which recognizes characters input onto the touch panel 23 and a program search unit 25 which searches a corresponding program based on a keyword shown by the input characters. It is noted that the control unit 11 is further provided with a selection unit which allows a user, when the number of search results by the program search unit 25 is more than one, to select one of them, although the selection unit is not shown.

The function as a cellular phone and the TV watching function in the portable terminal 10 are not especially different from ones of known cellular phones and TV receiving apparatuses respectively, and the detailed explanation for such functions is thus omitted.

Figure 2:
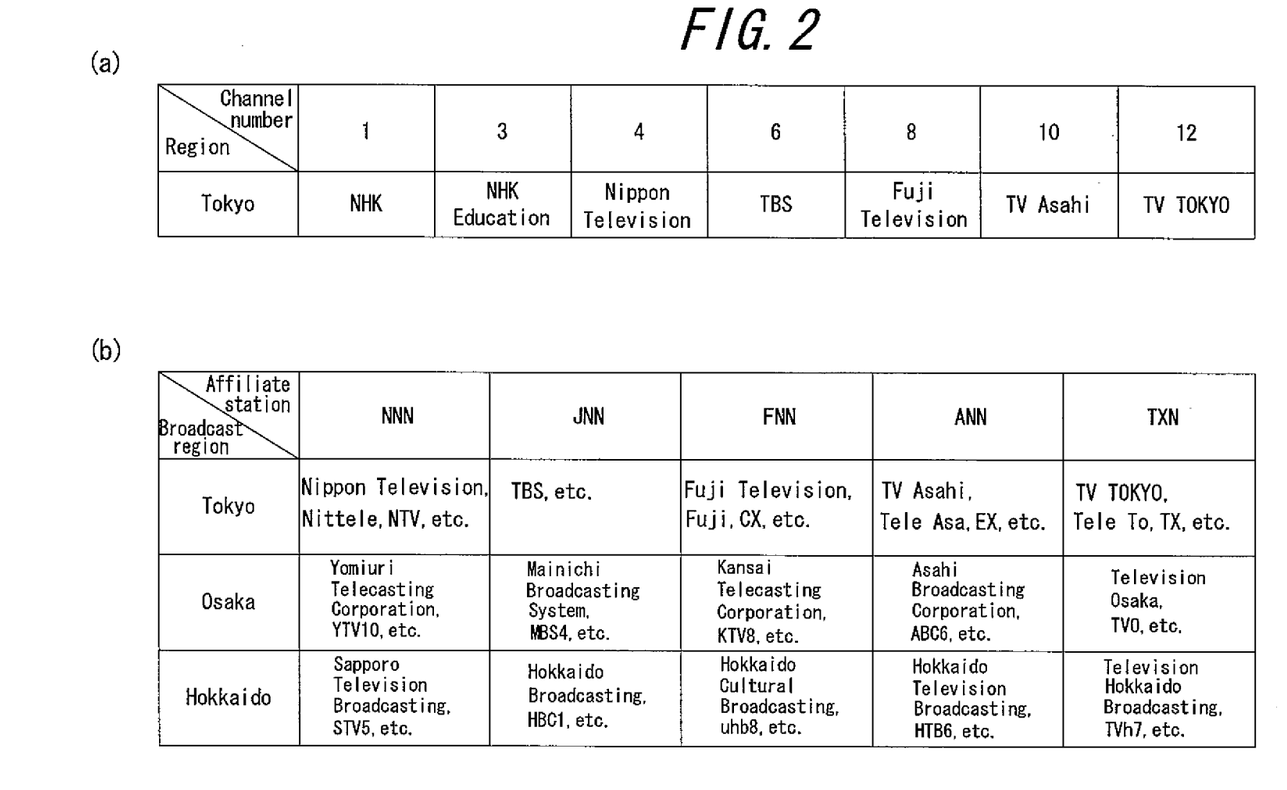
FIG. 2 is a schematic table illustrating an example of information stored in a memory unit of a broadcast receiving apparatus of the embodiment.

FIG. 2 is a schematic table illustrating one example of information stored in the memory unit 21.

As FIG. 2 (*a*) shows one example, the memory unit 21 stores the correlation between a channel number and a broadcasting station determined based on, for example, regional information or information of a base station included in a TS packet, or regional information such as GPS information and the like. In FIG. 2(*a*), there is shown the correlation between broadcasting stations and channel numbers in Tokyo area. However, the correlation between a broadcasting station and a channel number may be varied if a user changes a present location to another. Therefore, it is preferable that, as to such correlation, information of a plurality of regions is received altogether and plural sets of correlations between broadcasting stations and channel numbers in each region are stored in advance, thereafter only the correlation between broadcasting stations and channel numbers in a current location is read out. Furthermore, it is possible to arrange so that such correlation is established when a TV watching application is activated on the portable terminal 10, or so that the correlation is automatically updated regularly or at a given time.

Furthermore, although not shown, the memory unit 21 stores, in advance, program-related information including the time, the name and content explanation of each broadcast program in each broadcasting station in a form including keywords thereof, based on information such as EPG.

As FIG. 2(*b*) shows one example, the memory unit 21 further stores the correlation between the name of an affiliate station and the name and the abbreviated name of a broadcasting station in each region, etc. It is preferable that, as to such correlation as well, information of a plurality of regions is received altogether and plural sets of correlations between the names of affiliate stations and the names and the abbreviated names of broadcasting stations in each region, etc. are stored in advance, thereafter only the correlation between the names and the abbreviated names of broadcasting stations, etc. and the names of affiliate stations in a current location is read out. Furthermore, it is possible to arrange so that such correlation is also established when a TV watching application is activated on the portable terminal 10, or so that the correlation is automatically updated regularly or at a given time.

Next, channel selection in the portable terminal 10 according to the embodiment will be described with reference to FIGS. 3 to 6.

Figure 3:
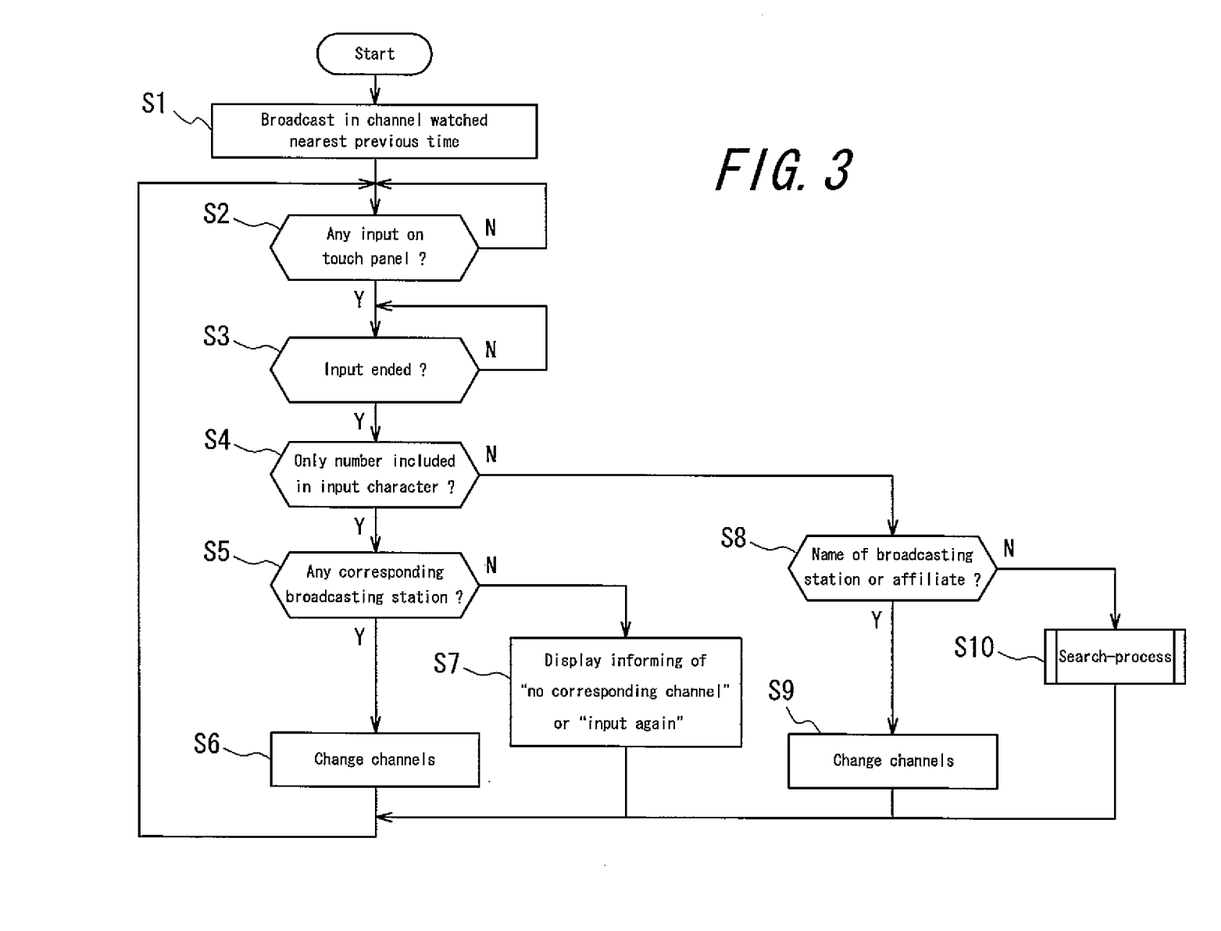
FIG. 3 is a flowchart explaining a channel selection operation of the embodiment.

FIG. 3 is a flowchart explaining a channel selection process of the embodiment. First, the process starts with activation of a TV watching application on the portable terminal 10. When the TV watching application is started, the control unit 11 automatically selects a channel which was being watched when the TV watching application was ended the last time, and displays video of broadcast signals on the display unit 20 (Step S1).

Figure 4:
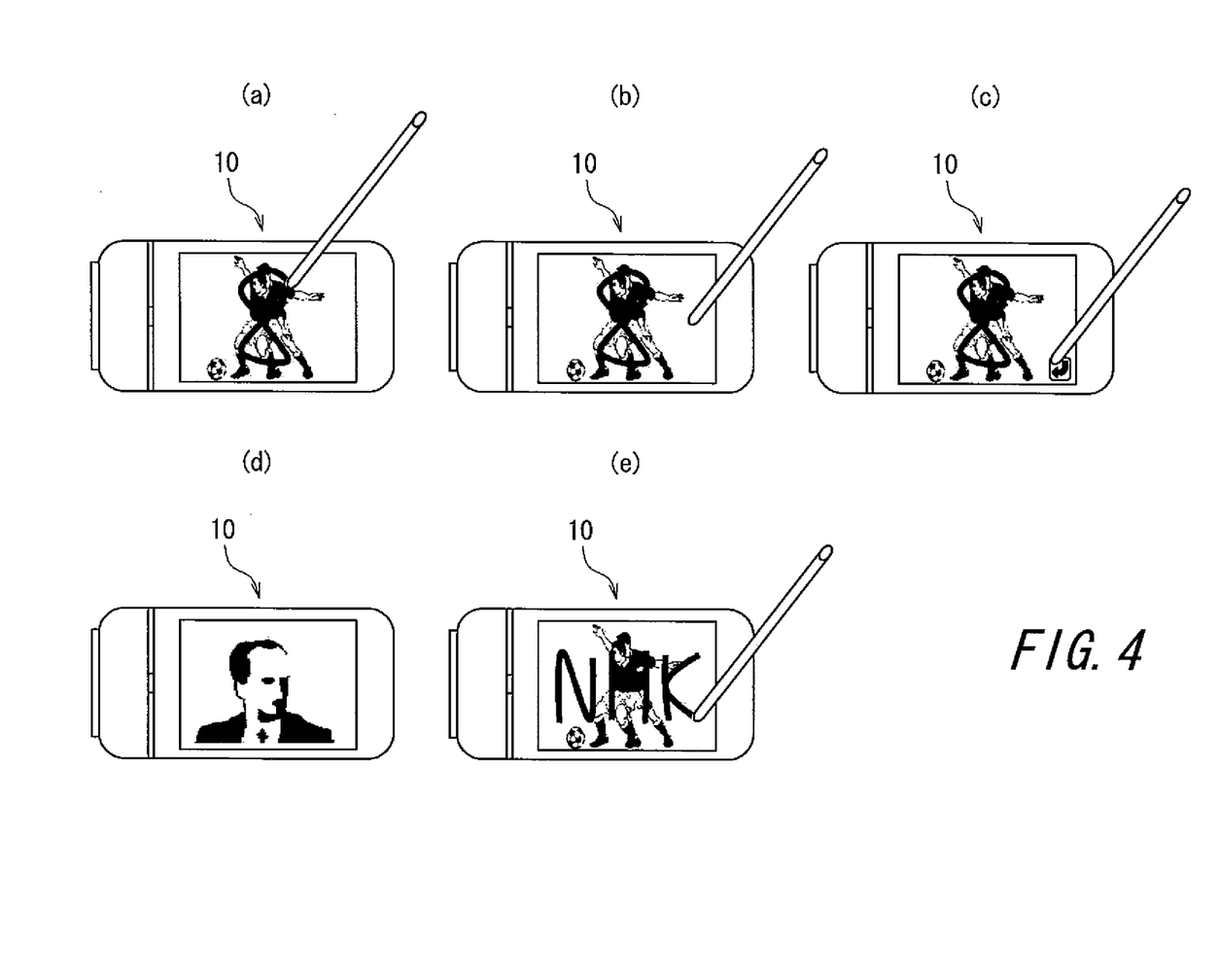
FIG. 4 is a schematic diagram roughly illustrating an example of channel selection operation and screen display of the embodiment.

Next, the control unit 11 determines whether or not there is input onto the touch panel 23 by a user (Step S2). The input onto the touch panel 23 may be performed by using a pen-type input device such as a stylus pen, as shown in FIG. 4(*a*), or by using a user's finger or the like to input directly onto the touch panel 23. In this input, when a user who is currently in Tokyo area wants to watch a program being broadcasted on "Fuji Television", the user inputs a character or a character string, such as a number "8", "Fuji Television", "Fuji", "CX", "FNN" or the like, to specify the broadcasting station which broadcasts a program which the user wants to watch, on the touch panel 23 by handwriting. Moreover, when a user does not select a specific channel or a broadcasting station but wants to watch a news program, for example, the user inputs the character string "news" which is a keyword on the touch panel 23 by handwriting.

When there is an input, it is subsequently determined whether or not the user has performed operation for the end of input (Step S3). The "operation for the end of input" here is operation by which a user himself informs that he has finished handwritten input, and some aspects are conceivable. For example, the operation for the end of input may be defined by user's touching an arbitrary part or a given part of the touch panel 23 again after finishing handwritten input, as shown in FIG. 4(*b*), or by touching an "Enter" key displayed in an unobtrusive position on the screen, as shown in FIG. 4(*c*). Alternatively, the end of input may be determined automatically when a given time has passed since user's last input onto the touch panel 23.

The character input onto the touch panel 23 by handwriting can be displayed by its locus on the display unit 20 so that a user can visually recognize the input easily, as shown in FIG. 4(*a*). Alternatively, it is also possible to set so that such locus is not displayed on the display unit 20 if it interferes with TV watching.

After the operation for the end of input is performed, the character recognition unit 24 determines whether or not the input character includes only a number (Step S4). In case that the input character includes only a number, the control unit 11 judges that the number denotes a channel number and determines whether or not a broadcasting station in a current location corresponding to the channel denoted by the number is stored in the memory unit 21 (Step S5). In case that a broadcasting station in a current location corresponding to the input number is stored, the control unit 11 changes a channel to the broadcasting station (Step S6), as shown in FIG. 4(*d*), and finishes the process of changing channels, so that the process returns to Step S2. It is noted that, when a channel which is currently watched is input, the control unit 11 does not change channels, so that the process returns to Step S2.

In case that a broadcasting station in a current location corresponding to a number input by a user is not found, the control unit 11 provides display informing of "no channel is corresponding" or prompting the user to "input again" (Step S7) and does not change channels, so that the process returns to Step S2.

In case that it is determined at Step S4 that the character input by a user includes not only a number, the character recognition unit 24 determines whether or not the input character is the name or the abbreviated name of a broadcasting station, or the name of an affiliate thereof, etc. (Step S8).

In case that the character recognition unit 24 determines that the character input by a user is the name or the abbreviated name of a broadcasting station, or the name of an affiliate thereof, etc., the control unit 11 reads out a broadcasting station in a current location corresponding to such name or abbreviated name of the broadcasting station, or the name of an affiliate thereof, etc., from the memory unit 21, changes a channel to the broadcasting station (Step S9) and finishes the process of changing channels, and the process returns to Step S2. It is noted that, when the name or the abbreviated name of a broadcasting station which is currently watched, or the name of an affiliate thereof, etc. is input, the control unit 11 does not change channels, and the process returns to Step S2.

Also when a user inputs the name or the abbreviated name of a broadcasting station, or the name of an affiliate thereof, etc., the character input onto the touch panel 23 can be displayed by its locus on the display unit 20 so that a user can visually recognize the input easily, as shown in FIG. 4(e). Alternatively, it is also possible to set so that such locus is not displayed on the display unit 20 if it interferes with TV watching.

Figure 5:
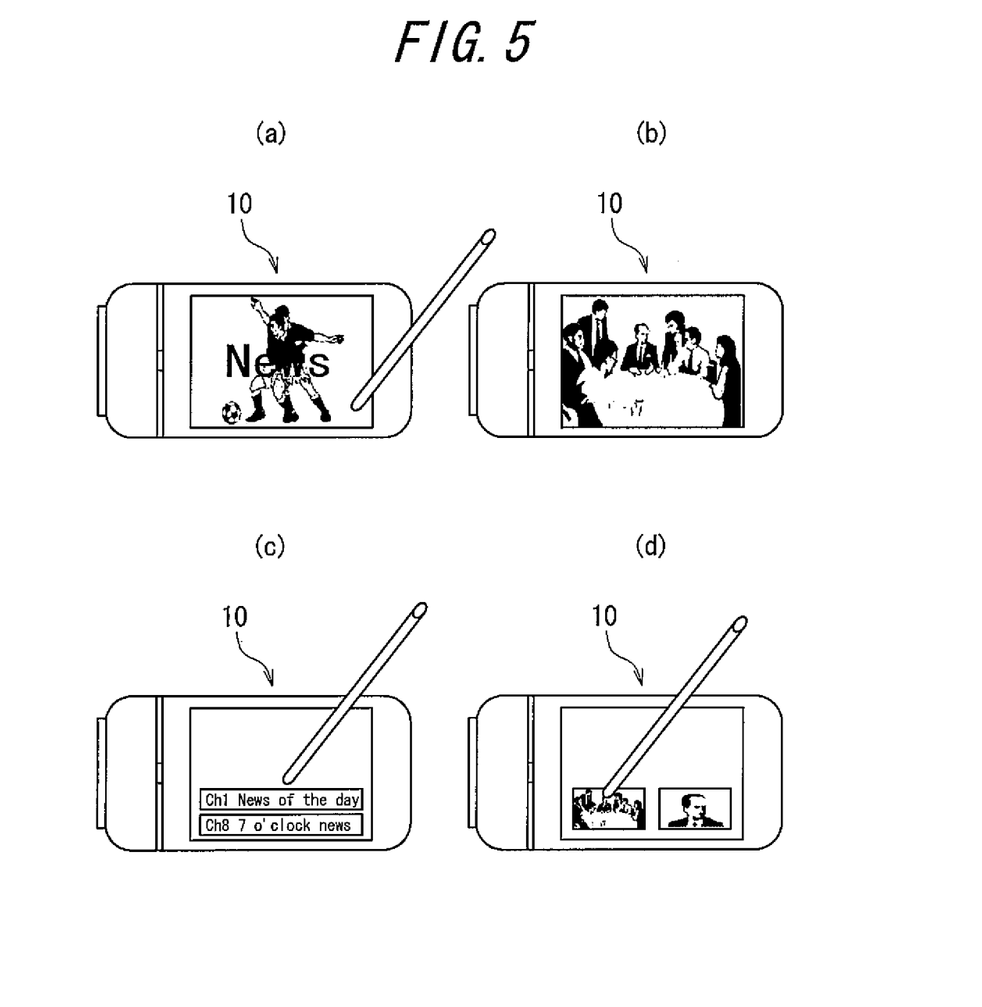
FIG. 5 is a schematic diagram roughly illustrating another example of channel selection operation and screen display of the embodiment.

On the other hand, in case that it is determined that the character input by a user is not the name or the abbreviated name of a broadcasting station, or the name of an affiliate thereof, etc.: when the character string "news" is input, for example, as shown in FIG. 5(a), the process goes to Step S10 of program search process.

Figure 6:
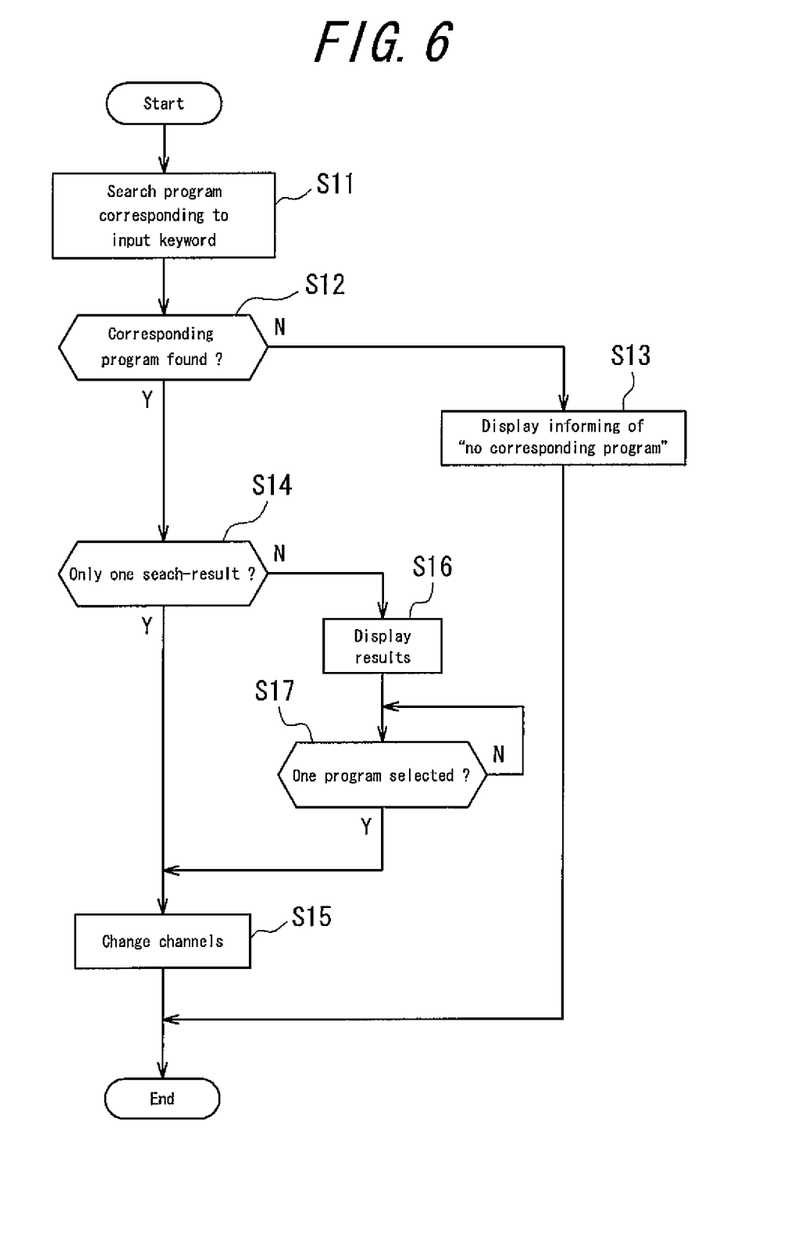
FIG. 6 is a flowchart explaining a program search process of the embodiment.

In the program search process, as shown in a flowchart of FIG. 6, the program search unit 25 firstly searches a keyword corresponding with a character or a character string input by a user, in the memory unit 21 storing program-related information such as EPG and the like (Step S11).

When the program search unit 25 searches information stored in the memory unit 21 at Step S12 and then can not find corresponding information, the control unit II judges that no broadcasting station broadcasts a program which a user wants to watch in a current location at a current time, and controls so that the display informing that there is no corresponding program is provided on the display unit 20 (Step S13). In this case, channels are not changed.

When the program search unit 25 searches program-related information corresponding with a character or a character string input by a user and then finds corresponding information in the memory unit 21, the control unit 11 determines whether the number of search results is only one or more than one (Step S14). In case that the number of search result is only one, the control unit 11 changes a channel to a broadcasting station which broadcasts a program corresponding to such program-related information (Step S15), as shown in FIG. 5(b). In this case, a broadcasting station which is broadcasting a news program is automatically selected. It is noted that, when a channel which is currently watched is searched, the control unit 11 does not change channels, and the process returns to Step S2.

In case that the number of search results found by the program search unit 25 is more than one, that is, a plurality of broadcasting stations are broadcasting a program relating to a keyword of character string input by a user, the control unit 11 displays the search results on the display unit 20 (Step S16) and prompts the user to select one from the plurality of search results (Step S17). In this case, it is possible to display a list of names, channel numbers and the like of programs relating to a keyword of character string input by a user, as shown in FIG. 5(c), for example. Alternatively, it is also possible to display thumbnails such as still images or the like obtained by capturing one frame of a program relating to a keyword of character string input by a user, as shown in FIG. 5(d).

In case that a plurality of programs are displayed on the display unit 20, a selection unit (not shown) in the control unit 11 allows a user to select one program by touching a character string of the name of a program, etc. or a thumbnail which is displayed on the display unit 20 through the touch panel 23. When one of the plurality of programs displayed on the display unit 20 is selected by the user, the control unit 11 change a channel to a broadcasting station which is broadcasting the program. It is noted that, when a channel which is currently watched is selected, the control unit 11 does not change channels in this case also, and the process returns to Step S2.

In this way, a user of the portable terminal 10 inputs a channel number of a broadcasting station onto the touch panel 23 by handwriting while watching a program of a current channel, thereby it is possible to change a channel to a desired one easily and directly with maintaining the terminal in a compact view style. Moreover, it is also possible to input the name or the abbreviated name of a broadcasting station, or the name of an affiliate thereof, etc., such as "Fuji Television", "NHK", "Tele To", "JNN" or the like, into the portable terminal 10 by handwriting so as to change a channel directly to a broadcasting station corresponding to such broadcasting station or affiliate thereof. Furthermore, the names of broadcasting stations in a plurality of regions are correlated in the memory unit 21, therefore when a user goes to Osaka and inputs "TBS" in watching TV on the portable terminal 10, "Mainichi Broadcasting System" which is a local station of the same JNN-affiliated is selected automatically. Similarly, when "ANN" is input directly, a channel is automatically changed to "TV Asahi" if a current location is Tokyo area, "Asahi broadcasting" if a current location is Osaka and "Hokkaido Television Broadcasting" if a current location is Hokkaido.

Furthermore, even when a broadcasting station which a user wants to watch is not concretely decided, for example, the user inputs a keyword such as the name, the genre or the category of a program, etc. which he wants to watch, thereby a channel is changed, if a broadcasting station which is currently broadcasting the corresponding program is available, to the broadcasting station. Therefore, even when a user does not know a broadcasting station which is broadcasting a program such as "8 o'clock news", "music program", "drama", "movie" or the like, a channel can be changed to a broadcasting station which is broadcasting such program if it is currently broadcasted.

In this way, a desired channel can be selected by handwriting information specific to each broadcasting station or a keyword specific to a program, such as a channel number, the name of a station, a program keyword and the like, on the touch panel. Therefore, even elderly people or children do not operate wrongly, and further, it becomes possible to switch channels in a short time and side keys and the like for up/down operation of channels becomes unnecessary.

It is noted that the present invention is not limited to the above embodiment, and many variations and modifications can be made. For example, in the above embodiments, three aspects of broadcasting station selection functions: selection of a broadcasting station by handwritten input of a channel number, selection of a broadcasting station by handwritten input of the name of a station such as a broadcasting station and selection of a broadcasting station by handwritten input of a program keyword are implemented in the portable terminal 10, while it is obviously possible as well to implement broadcasting station selection function according to any one or two of these aspects in the portable terminal 10.

Figure 7:
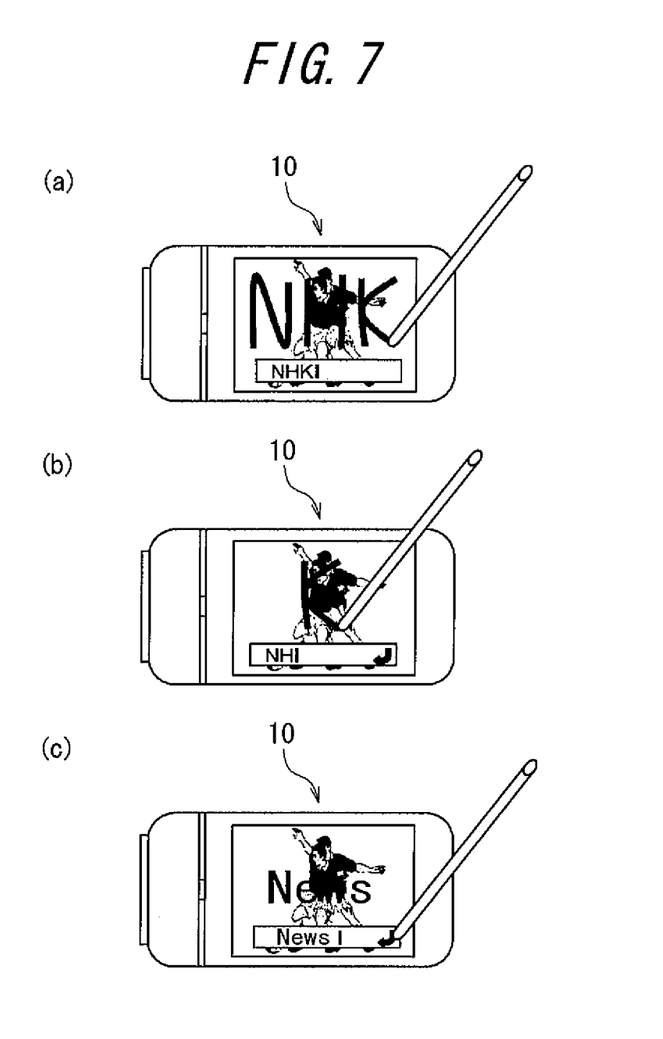
FIG. 7 is a diagram explaining a pop-up display of an input field in a modified example of the invention.

Moreover, especially in case of selection of a broadcasting station by handwritten input of the name of a station such as a broadcasting station or selection of a broadcasting station by handwritten input of a program keyword, in order to make it easier for a user to check the result of the recognition of a character or a character string which he has input by handwriting, it is preferable to set so that an input field of a character string is popped up in the display unit 20 to display the results of the recognition by the character recognition unit 24 of a character which the user has input onto the touch panel 23 in the input field. In this case, it is also possible to arrange so that characters input onto the touch panel 23 by a user by handwriting are recognized and displayed as a whole, as shown in FIG. 7(a), or so that characters input by a user by handwriting are recognized and displayed from one character to another character, as shown in FIG. 7(b). Moreover, when a user inputs some characters onto the input field in this way, the operation informing that a sequence of handwritten input operation has been finished may be defined, similarly to the above embodiment, by user's touching on an arbitrary part or a given part of the touch panel 23 again after finishing the input, or the end of the input is determined automatically when a given time has passed since user's last input onto the touch panel 23. Besides these, an arrow shape of icon or the like denoting "Enter (input)" as shown in FIG. 7(c) is displayed in a given part and, based on touch input thereto, it may be determined that the input operation has been finished. In this case also, similarly to the above embodiment, a character or a character string input by a user by handwriting can be displayed by its locus on the display unit 20. Alternatively, it is also possible to set so that such locus is not displayed if it interferes with TV watching.

As to such pop-up display of input field, it is also possible to set beforehand whether or not the pop-up is displayed when each of the above aspects for broadcasting station selection in the portable terminal 10 is used respectively. Moreover, when some of each aspect for broadcasting station selection are combined to use, it is also possible to set whether or not the pop-up is displayed selectively depending on each aspect.

INDUSTRIAL APPLICABILITY

According to the present invention, a user inputs, as a character or a character string, a channel number or the name of a station of a channel to which a user wants to switch a channel, etc., or a keyword of a program which a user wants to watch, directly on a touch panel by handwriting, thereby it is possible to switch a channel directly to such channel. Therefore, the user can switch a channel to a desired one promptly by simple operation without feeling stressed.

The invention claimed is:

1. A portable terminal, comprising:
a reception unit receiving a broadcast signal from a plurality of channels;
a display unit displaying video which corresponds to the broadcast signal;
a touch panel accepting handwritten input by a user on the displayed video, wherein the touch panel is integrated in the display unit;
a character recognition unit recognizing handwritten input onto the touch panel as a character or a character string;
a memory unit storing for each channel a character or a character string specifying the channel; and
a control unit switching a reception channel, when a character or a character string recognized by the character recognition unit corresponds to any one of characters or character strings stored in the memory unit while video corresponding to a broadcast signal received at the reception unit is displayed on the display unit, to a channel corresponding to the character or the character string.

2. A portable terminal, comprising:
a reception unit receiving a broadcast signal from a plurality of channels;
a display unit displaying video which corresponds to the broadcast signal;
a touch panel accepting handwritten input by a user on the displayed video, wherein the touch panel is integrated in the display unit;
a character recognition unit recognizing handwritten input onto the touch panel as a character or a character string;
a memory unit storing program-related information including the time, the name and content explanation of a program broadcasted in each of the plurality of channels;
a program search unit matching the character or the character string recognized at the character recognition unit with the program-related information and searching a program corresponding to the program-related information including the character or the character string recognized by the character recognition unit among currently-broadcasted programs while video corresponding to the broadcast signal received at the reception unit is displayed on the display unit; and
a control unit switching a reception channel, when the program search unit finds a program corresponding to the program-related information including the character or the character string recognized by the character recognition unit, to a channel in which the program is broadcasted.

3. The portable terminal according to claim 2, wherein the control unit has a selection unit allowing a user, when the program search unit finds a plurality of programs corresponding to the program-related information including the character or the character string recognized by the character recognition unit, to select a desired one from the plurality of found programs.

* * * * *